July 30, 1957 J. N. VOS 2,801,332
FREQUENCY-STABILIZING CIRCUIT RESPONSIVE TO TWO PILOT TONES FOR RADIO RECEIVER
Filed Oct. 29, 1953
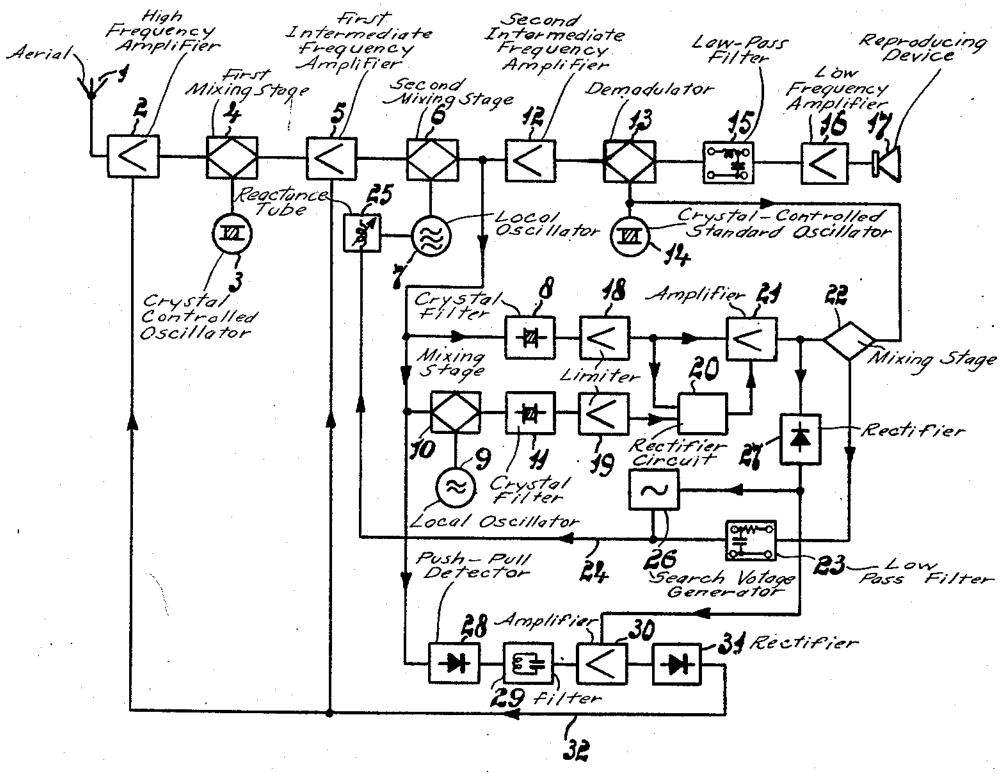
INVENTOR
JACOBUS NICOLAAS VOS
BY [signature]
AGENT 2,801,332

FREQUENCY-STABILIZING CIRCUIT RESPONSIVE TO TWO PILOT TONES FOR RADIO RECEIVER

Jacobus Nicolaas Vos, Hilversum, Netherlands, assignor, by mesne assignments, to North American Philips Company, Inc., New York, N. Y., a corporation of Delaware Application October 29, 1953, Serial No. 389,019

Claims priority, application Netherlands November 17, 1952

4 Claims. (Cl. 250—20)

The present invention relates to a frequency-stabilizing circuit arrangement.

In U. S. Patent No. 2,698,904, issued January 4, 1955, to Hugenholtz, and in copending U. S. patent application Serial No. 371,516, filed July 31, 1953, there is described a frequency-stabilizing circuit-arrangement for the automatic frequency correction (AFC) of a local oscillator on one of two pilot frequencies in an incoming signal, the frequency band of the signal transmitted being flanked by the pilot frequencies. This circuit-arrangement comprises a search-voltage generator, which is active only in the non-stabilized state for varying the local oscillator frequency, and two pilot-frequency selectors for selecting pilot frequencies exhibiting a given frequency difference, the output voltages of the said selectors in common controlling by way of limiters an auxiliary circuit in order to suppress the search voltage when the two pilot frequencies exhibiting the said frequency difference occur simultaneously.

Such AFC circuits are used, for example, for automatically stabilizing in frequency and/or phase a local oscillator oscillation in a superheterodyne receiver, more particularly a single side-band receiver, in such manner that precisely the desired intermediate frequency occurs. As a rule, the amplitudes of the pilot-frequency signal will be considerably smaller (for example, 20 dbs) than the amplitudes of the side-band signals produced by the signal transmitted.

An important advantage of the described circuit-arrangements is their insensitivity to interference signals, since in order to ensure reaction of the AFC circuit, two pilot signals located within the transmission ranges of the pilot-frequency selectors must be available at the same time. The possibility of stabilization on interference signals simulating pilot frequencies is small and thus smaller, according as the bandwidth of the pilot-frequency selectors is narrower. A bandwidth of, for example, about 100 cycles per second has been found to be suitable for the pilot-frequency selectors in connection with searching velocities required in practice.

The applicant has found that in circuit-arrangements of the type described, the effective selectivity frequently does not come up to such expectations as are reasonable on the ground of the bandwidth of the pilot-frequency selectors.

The object of the present invention is to mitigate or suppress the aforementioned disadvantage.

According to the invention, in frequency-stabilizing circuits of the type described, the incoming signal, together with the pilot frequencies, is supplied to the pilot-frequency selectors by way of an amplifier having a gain factor which is adjustable by an AVC voltage, and to an AVC control voltage circuit comprising successively a detector which is substantially quadratic, a selecting circuit tuned to the said frequency difference of the pilot frequencies and a rectifier, from the output of which the AVC voltage is derived.

As soon as stabilization occurs, the AVC control brought about by the said AVC control voltage circuit is preferably made inoperative, for example by means of a blocking voltage which then occurs and which substantially blocks an amplifier provided in the AVC control voltage circuit.

In order that the invention may be readily carried into effect, it will now be described with reference to the accompanying drawing, wherein the single figure is a schematic diagram of a preferred embodiment of the circuit arrangement of the present invention.

A single side-band signal with suppressed carrier wave is received by an aerial 1, which signal is supposed to comprise, in addition to the intelligence signals, two pilot frequencies located above and below the signal band, respectively. The received signal is supplied, after being amplified in a high-frequency amplifier stage 2, together with the signal originating from a crystal-controlled oscillator 3, to a mixing stage 4. The intermediate-frequency signal obtained after mixing, the frequencies of which extend, for example, between 1000 and 996 kilocycles per second and in which the frequencies of 1000 and 996 kilocycles per second represent the pilot frequencies, is mixed after intermediate-frequency amplification in an intermediate frequency amplifier stage 5, in a second mixing stage 6, with a 1060 kilocycles per second oscillation generated by a local oscillator 7 which is automatically corrected in frequency.

The single side-band signal which occurs in the output circuit of the mixing stage 6 and which extends, after having been transposed twice, over a frequency range of from 60 to 65 kilocycles per second, is supplied for the purpose of selecting the pilot frequencies of now 60 and 64 kilocycles per second, respectively, to a first pilot-frequency selector 8, constituted by a crystal filter tuned to 60 kilocycles per second, and a second pilot-frequency selector, constituted by the combination of a mixing stage 10 connected to a local oscillator 9 tuned to 4 kilocycles per second with an input circuit tuned to 64 kilocycles per second and a crystal filter 11 which is likewise tuned to 60 kilocycles per second. The intermediate-frequency signal derived from the mixing stage 6 is suppled to a demodulator 13 by way of a second intermediate-frequency amplifier 12 which passes frequencies of from 60.3 to 63.5 kilocycles per second only. The demodulator 13 has supplied to it a local oscillator signal tuned to 60 kilocycles per second and originating from a crystal-controlled standard oscillator 14. The low-frequency signals (0.3 to 3.5 kilocycles per second) occurring in the output circuit of the demodulator are supplied, by way of a low-pass filter 15 and a low-frequency amplifier 16, to a reproducing device 17.

The pilot frequencies derived from the pilot-frequency selectors 8 and 9 to 11 are supplied to limiters 18 and 19, respectively, and when available at the same time bring about an auxiliary direct voltage at the output of an auxiliary rectifying circuit 20. The auxiliary direct voltage releases an amplifier 21 which is blocked in the absence of frequency stabilization. The output voltage of limiter 18, the frequency of which must be 60 kilocycles per second, is supplied by way of amplifier 21 to a mixing stage 22. A 60 kilocycles per second signal produced by the standard oscillator 14 is supplied to the mixing stage 22. The mixing stage 22 fulfils the function of a phase detector and supplies an AFC voltage which is dependent upon the phase relation of the voltages being compared, i. e., the voltages from amplifier 21 and oscillator 14, and which is suitable for stabilizing the frequency and phase of the second local oscillator 7 with respect to the frequency and phase of the standard oscillator 14. The output voltage of the mixing stage 22 is supplied for this purpose by way of a low-pass filter 23 and a lead 24 to a reactance tube 25 which is coupled to the frequency-determining circuit of oscillator 7.

The lead 24 has connected to it a search-voltage generator 26, of which the output voltage having a frequency of, for example, 1 cycle per second brings about frequency modulation of the second local oscillator 7 till the two pilot-frequency selectors 8, 9—11 transmit incoming pilot signals and so-called "catching" by the AFC circuit occurs. The amplifier 21, which is then released, transmits the pilot signal supplied by way of limiter 18 and this pilot signal, as previously described, is supplied not only to the mixing stage 22, but also to a rectifier 27 which supplies a negative direct voltage blocking the search-voltage generator 26 and which thus stops the searching process.

In view of, for example, fading phenomena, the described circuit-arrangement must be so designed that the comparatively weak pilot signals normally control the limiters 18, 19 in limitation, for example by 26 dbs. However, this necessitates that, on the one hand, signals corresponding in frequency approximately to the tuning frequency of the selectors 8, 9—11 but having a much smaller amplitude and, on the other hand, signals having approximately the same amplitude as the pilot signals, but having frequencies which considerably differ from the tuning frequency of the selectors 8, 9—11 can control the limiters 18, 19 till in limitation. When the bandwidth, measured in the normal way (half power width) of the selectors 8, 9—11 is, for example, 100 cycles per second, the bandwidth which is effective under these conditions may be, for example, about 400 or 500 cycles per second. Intermodulation products from the transmitter and other interference signals may thus appear as the desired pilot signals and cause the searching and catching by the AFC circuit to be (temporarily) stopped.

In order to obviate the said disadvantages, it is necessary to ensure that during searching and catching by the AFC circuit the limiters 18, 19 are controlled precisely in limitation by the pilot signals. The amplification control thus required for the amplifying stages, for example amplifiers 2 and 5, provided between the aerial 1 and the second intermediate-frequency amplifier 12, must be effected as a function of the constant part of the signal to be received, that is to say the pilot signals.

The required AVC voltage is derived from the output voltage of the mixing stage 6 by means of an AVC control voltage circuit comprising successively a detector 28 having a quadratic characteristic curve, a filter 29 which is selective for the given frequency difference (4 kilocycles per second) between the pilot signals, an amplifier 30 and a rectifier 31. The AVC voltage derived from the output of rectifier 31 is supplied by way of a lead 32 for amplification control to the amplifiers 2 and 5.

The detector 28, having supplied to it the transmitted signal flanked by the pilot frequencies, has a quadratic characteristic curve. For this purpose use may be made of a crystal detector or a triode-grid detector with a suitable choice of that part of the demodulation characteristic curve which is to be used on the basis of variations in the amplitude of the input signal.

Use is preferably made of a push-pull detector having, for example, a double triode tube. At the output thereof only sum and difference frequencies of the incoming signal components occur. The highest difference frequency which may be derived from the signals to be received corresponds to the frequency difference of the pilot signals and is 4 kilocycles per second. The amplitude of this voltage of difference frequency is proportional to the product of the pilot signals emitted with constant amplitude and is thus suitable to serve as a measure of the strength of the incoming signal.

The output voltage of the quadratic detector 28 is supplied to the filter 29, which is tuned to 4 kilocycles per second and which has a bandwidth of, for example, 100 cycles per second. It has been found that the AVC voltage obtained after amplification and rectification of the output voltage of the filter is substantially not influenced by sum frequencies of the incoming signal occurring in the quadratic detector.

The aforementioned AVC voltage has been found to be suitable for obtaining an AVC control which is sufficiently rapid (time-constant about 0.01 second) and, provided that the gain factor of amplifier 30 is chosen to be sufficiently high (for example from 20,000 to 30,000), which is sufficiently low (variation of the output voltage of mixing stage 6 about 1 db at a more than 20 dbs variation of the signal received by the aerial 1) to avoid insufficient amplitude discrimination and an unwanted increase of the effective bandwidth of the pilot-frequency selectors during the catching by the AFC circuit.

After the catching by the AFC circuit, the AVC control voltage circuit is blocked by blocking the amplifier 30 provided therein (or, if desired, detector 28 or rectifier 31) by means of the blocking voltage which originates from the rectifier 27 and by which the search-voltage generator 26 is also made inoperative.

While the invention has been described by means of a specific example and in a specific embodiment, I do not wish to be limited thereto, for obvious modifications will occur to those skilled in the art without departing from the spirit and scope of the invention.

What is claimed is:

1. A frequency-stabilizing circuit-arrangement for automatic frequency correction of a local oscillator controlled by a voltage responsive reactance device, said circuit-arrangement comprising means for intercepting an incoming signal having an intelligence wave and two pilot frequency voltages having a predetermined frequency difference, the frequency of one of said pilot frequency voltages being located below and the other above the frequency of said intelligence wave, an amplifier coupled to said intercepting means for amplifying said incoming signal, said amplifier having a gain factor adjustable by an automtic volume control voltage, means for mixing the ampilfied incoming signal with the output voltage from said local oscillator to produce a beat wave, selective means to derive from said beat wave said two pilot frequency voltages, a search voltage generator coupled to said reactance device to supply a search voltage thereto, means coupled to said selective means for suppressing the search voltage from said search voltage generator at the simultaneous occurrence of said two pilot frequency voltages in said suppressing means, an automatic volume control circuit for producing an automatic volume control voltage, said volume control circuit comprising in succession a substantially quadratic detector, a selecting circuit tuned to the frequency difference of said two pilot frequencies, and a rectifier, means for applying the beat wave to the input of said volume control circuit and means for applying the automatic volume control voltage from the output of said automatic volume control circuit to said amplifier.

2. A circuit-arrangement as set forth in claim 1, wherein said quadratic detector is constituted by a push-pull detector.

3. A circuit-arrangement as set forth in claim 1, wherein said suppressing means is coupled to said automatic volume control circuit to render same inoperative when the search voltage is suppressed.

4. A circuit-arrangement as set forth in claim 3, wherein said automatic volume control circuit further includes an amplifier, said suppressing means being coupled to said amplifier.

References Cited in the file of this patent

UNITED STATES PATENTS

| | | |
|---|---|---|
| 2,270,023 | Ramsay et al. | Jan. 13, 1942 |
| 2,287,925 | White | June 30, 1942 |
| 2,589,387 | Hugenholtz | Mar. 18, 1952 |